(12) United States Patent
Buell

(10) Patent No.: US 6,578,834 B1
(45) Date of Patent: Jun. 17, 2003

(54) STABILIZING PLATE FOR USE WITH SPRING-MOUNTED SEATS OR SADDLES

(76) Inventor: William Smith Buell, 32196 Via de Oliva, San Juan Capistrano, CA (US) 92675

( * ) Notice: Subject to any disclaimer, the term of this patent is extended or adjusted under 35 U.S.C. 154(b) by 0 days.

(21) Appl. No.: 10/105,106

(22) Filed: Mar. 25, 2002

(51) Int. Cl.[7] ................. B62J 1/02; F16F 1/00
(52) U.S. Cl. ..................................... 267/132
(58) Field of Search ................. 267/132, 166, 267/166.1

(56) References Cited

U.S. PATENT DOCUMENTS

| | | | | |
|---|---|---|---|---|
| 593,631 A | * | 11/1897 | Wood | 267/132 |
| 678,372 A | * | 7/1901 | Blagon-Richards | 267/132 |
| 975,827 A | * | 11/1910 | Busch | 267/132 |
| 1,344,382 A | * | 6/1920 | Condon | 297/210 |
| 1,457,241 A | * | 5/1923 | Williams | 267/132 |
| 1,474,977 A | * | 11/1923 | Mesinger et al. | 267/132 |
| 2,318,246 A | * | 5/1943 | Mesinger | 297/210 |
| 2,331,213 A | * | 10/1943 | Mesinger | 297/203 |
| 2,558,151 A | * | 6/1951 | Parke | 267/133 |
| 2,600,915 A | * | 6/1952 | Persons | 297/210 |
| 3,249,384 A | * | 5/1966 | Timms | 297/209 |
| 3,698,763 A | * | 10/1972 | Worley | 297/214 |
| 3,884,525 A | * | 5/1975 | Mesinger | 297/212 |
| 4,103,858 A | * | 8/1978 | Swenson | 248/576 |
| 5,507,476 A | * | 4/1996 | Lin | 267/132 |

* cited by examiner

*Primary Examiner*—Christopher P. Schwartz
*Assistant Examiner*—Devon Kramer

(57) ABSTRACT

The invention is a hinged stabilizing plate for use with spring-mounted seats or saddles on vehicles including bicycles, motorcycles, quadrunners, and other similar types. The device allows full travel by the springs in a vertical motion while not allowing any sideward drift or fore-and-aft travel from its base, the seat support, or the frame. This device ensures stable vertical travel on seats that are mounted on three or four springs only.

1 Claim, 3 Drawing Sheets

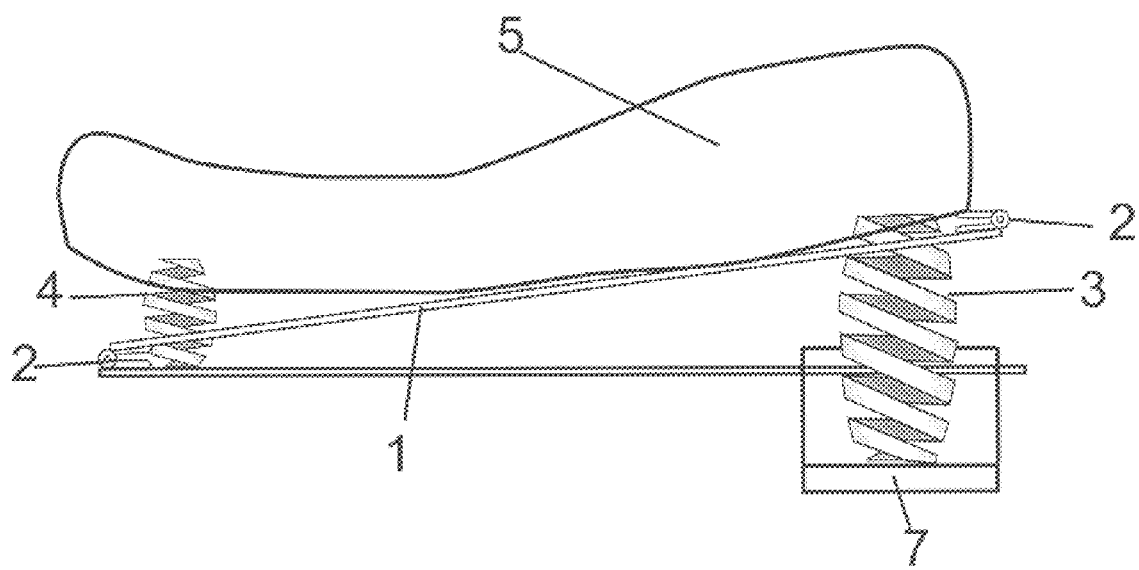
Figure 1 - Side View

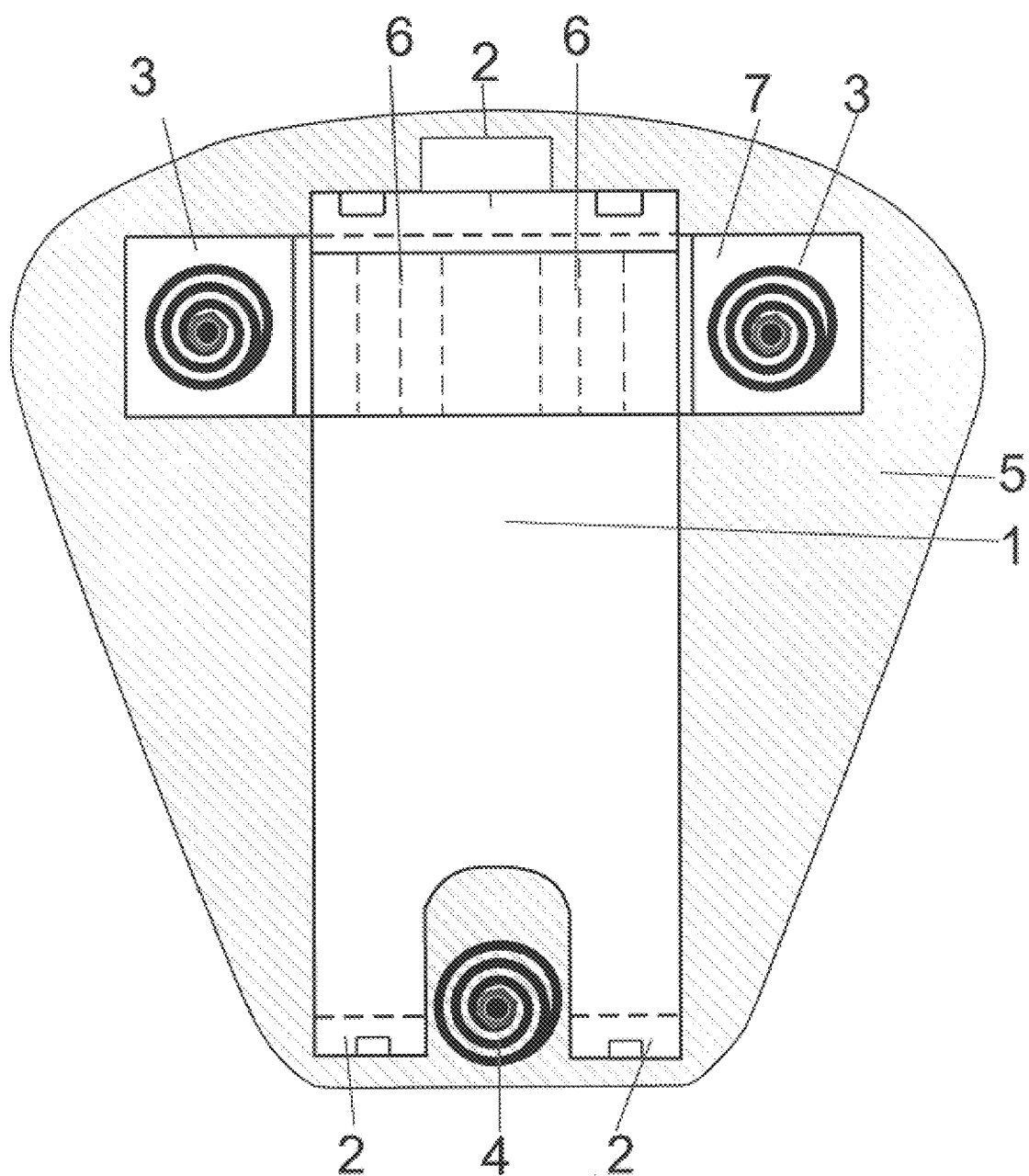
Figure 2 Top View

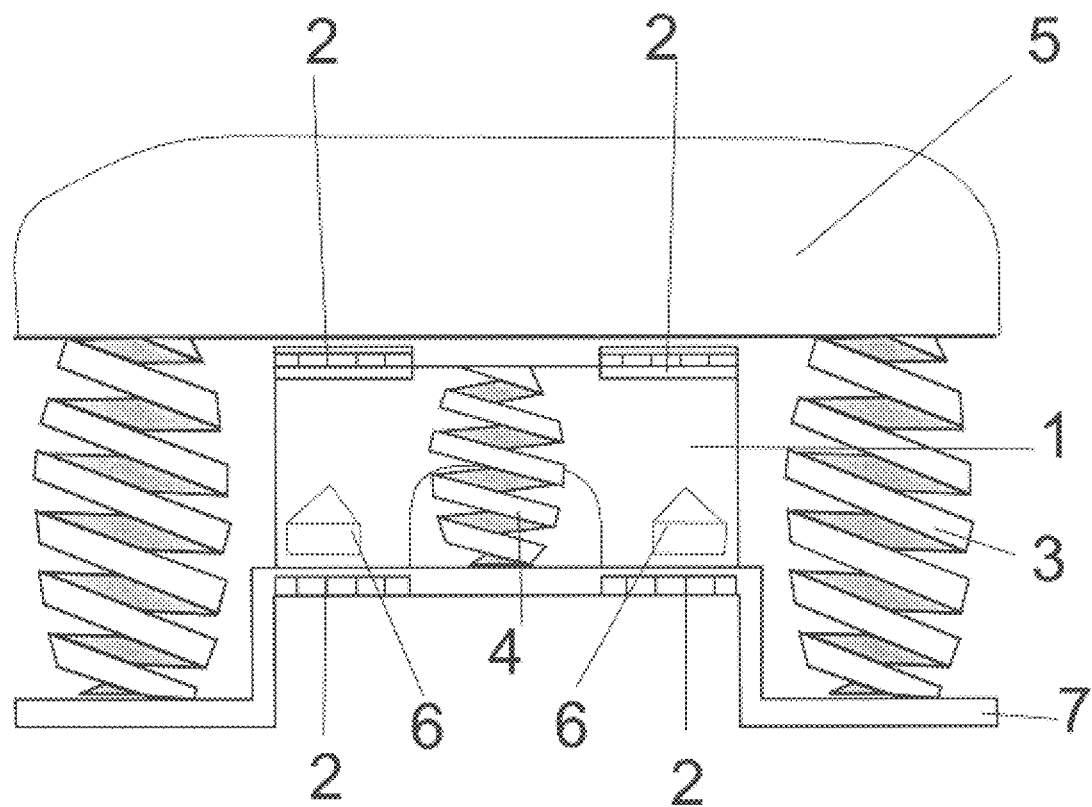
Figure 3 - Back View

STABILIZING PLATE FOR USE WITH SPRING-MOUNTED SEATS OR SADDLES

BACKGROUND OF THE INVENTION

1. Field of the Invention

This invention entails a vertical seat guide for vehicles, bicycles, or vessels. The device allows full travel by the springs in a vertical motion while not allowing any sideward drift or fore and aft travel form its base, the seat support, or the frame. This present device ensures stable vertical travel on seats that are mounted on three or four springs, but can be modified to include any number of springs.

2. Description of Prior Art

U.S. Pat. No. 6,270,065 to Cato discloses a suspension apparatus which allows the seat to move up and down on a rigid horizontal plane not allowing any give front to back. The seat of Cato must stay on a level plane at all times. The instant invention provides an improvement to the above in that the springs are positioned fore and aft allowing movement from the front wheel and back wheel to be independent of the seat.

U.S. Pat. No. 593,631 to Wood discloses a seat cushioning assembly consisting of a primary seat post and a secondary seat post that travels parallel to the first seat post on a vertical plane. The arrangement allows for movements in a horizontal plane affixed by the seat on the secondary post, but does not allow for any other movements. The instant invention has three springs, and does not allow for variable horizontal plane travel or full travel up and down.

U.S. Pat. No. 4,103,858 to Swenson discloses a forward pivotal strut connected between the frame and the seat. The back portion of the seat having an adjustable spring. The instant invention has a fixed spring fore and two fixed springs aft allowing for movement of shock from the front wheel as well as movement of shock from the back wheel.

U.S. Pat. No. 5,489,139 to McFarland discloses a configuration that allows for vertical motion of the seat on a horizontal plane. McFarland does not allow tolerance for variance horizontally while moving vertically. The instant invention allows a controlled variance in the horizontal plane at the same time allowing for full vertical motion. The horizontal variance allows the front of the frame as well as the back of the frame to jolt up and down with the wheels while no agitating the driver.

BRIEF SUMMARY OF THE INVENTION

Since nearly all seats on vehicles are attached directly to the frame of that vehicle, the rider/driver is affected by the motion/jarring of the vehicle. With a stabilizing plate, it is possible to mount the seat on springs all around and still have a stable seat that does not wobble or lean from side to side. The vertical shock stemming from the road transferred through the wheels, forks, and frame are quite easily absorbed by the springs at the front of the seat and the springs at the rear of the seat. The stabilizing plate keeps the seat on an even keel while riding preventing wobble or leaning from side to side. The purpose of the stabilizing plate is to allow riders or drivers a much more comfortable ride.

BRIEF DESCRIPTION OF THE DRAWINGS

FIG. 1 is a side view of the preferred embodiment of the invention with a stabilizing plate shown with a seat and springs.

FIG. 2 is a top view of the preferred embodiment of the invention with a stabilizing plate showing through the seat.

FIG. 3 is a back view of the preferred embodiment of the invention with the stabilizing plate shown with a seat and springs attached.

DETAILED DESCRIPTION OF THE DRAWINGS

FIG. 1 shows the stabilizing plate 1 reaching diagonally and attached to two hinges 2. The hinges are then attached to the forward area of the frame/seat support. The other end of the stabilizing plate 1 is attached to another pair of hinges 2 which in turn are attached to the underneath and back edge of the seat 5

FIG. 2 shows three hinges 2. Two of the hinges are fastened between the front edge of the stabilizing plate 1 and the forward edge of the seat support or frame. The other two hinges are attached to the upper or aft edge of the stabilizing plate 1 and the bottom edge of the seat 5.

FIG. 3 shows the back of the seat 5 which is supported by two springs 3. The springs rest on a bracket 7 which in turn rests on a seat support or the frame if no seat support is used. The front spring 4 is located at the front of the seat support and it supports the seat from the frame of the vehicle. There are hinges 2 between the seat 5 and the stabilizing plate 1 which is then fastened to the frame or seat support. There are high-impact panels 6, cut for progressive cushioning to prevent bottoming out against the stabilizing plate.

Since nearly all seats on vehicles are attached directly to the frame of that vehicle, the rider/driver is affected by the motion/jarring of the vehicle. The stabilizing plate 1 enables the mounting of the seat 5 on springs 3 all around, and still have a stable seat that does not wobble or lean from side to side. The vertical shock stemming from the road transferred through the wheels, forks, and frame are quite easily absorbed by the spring or springs 3 at the front of the seat as well as the two springs 3 at the rear of the seat. It is the stabilizing plate 1 that keeps the seat on an even keel while riding. The plate is hinged 2 at either end with one end attaching to the frame and the other to the seat or seat support. The stabilizing plate 1 is used in conjunction with springs 3 and is used for vertical shock fore and aft, allowing the seat 5 to move independently of the frame. The stabilizing plate 1 can be made of any suitable material that matches the vehicle on which it is used. For example, on a motorcycle, steel would be used for the plate; on a wave runner, a stainless steel might be used to avoid rust; on a mountain bike, a lightweight titanium might be used. The stabilizing plate and seat arrangement can be used in all modes of transportation where a rider/driver has a firm grip on the vehicle with their hands and feet.

LIST OF DRAWING REFERENCE NUMERALS:

1. Stabilizing Metal Plate
2. Hinges
3. Five-Inch Spring
4. Two and One Half-Inch Springs
5. Seat
6. Progressive Cushioning
7. Spring Mounting Plate

What is claimed is:

1. A hinged stabilizing plate for a vehicle, comprising: a plate hinged in the middle attached to a seat of the vehicle on one end and a seat support or frame of the vehicle on an opposite end, the seat having a spring fore and two springs aft; the plate allowing for maximum vertical travel of the seat with the springs mounted front and rear keeping the seat in vertical alignment; the plate keeping the seat in a near-horizontal plane thereby allowing the supporting frame to have up-and-down motion without causing the rider sitting on the seat to slide from side to side.

* * * * *